United States Patent [19]

Allison

[11] Patent Number: 4,675,964
[45] Date of Patent: Jun. 30, 1987

[54] TITANIUM ENGINE VALVE AND METHOD OF MAKING

[75] Inventor: John E. Allison, Plymouth, Mich.

[73] Assignee: Ford Motor Company, Dearborn, Mich.

[21] Appl. No.: 813,173

[22] Filed: Dec. 24, 1985

[51] Int. Cl.[4] .......................... B21K 1/20; B23P 19/04
[52] U.S. Cl. ................................................ 29/156.7 R
[58] Field of Search .................................. 29/156.7 R

[56] References Cited

U.S. PATENT DOCUMENTS 1,230,140  6/1917  Ellery .
1,347,542  7/1920  Hilty .
1,547,125  7/1925  Keller .
2,002,641  5/1935  McBride .
3,536,053  10/1970  Vitcha et al. .

OTHER PUBLICATIONS

"Engineering of the Poppet Valve" by Newton, *A Symposium On Internal Combustion Engine Valves*, Pub. by Thompson Products, Inc., Cleveland, Ohio, 1956, pp. 65–78.

"Forgings in Titanium Alloys", by Scanlon et al, *Science Technology and Application of Titanium*, Pergamon Press, 1970, pp. 79–95 and 97–110.

"Recent Development in Hot Die Forging of Titanium Alloys", TI-80 *Science and Technology*, 1980, pp. 2513–2522.

*Primary Examiner*—Timothy V. Eley
*Attorney, Agent, or Firm*—Joseph W. Malleck; Roger L. May

[57] ABSTRACT

A method is disclosed for making a dual microstructure titanium based engine valve, wherein a first zone of the valve contains essentially a mixture of fine, equiaxed alpha and transformed beta crystalline grains which exhibit high tensile strength and high fatigue resistance, and a second zone of the valve which contains essentially a colony type microstructure exhibiting resistance to high temperature creep. The method comprises: (a) preparing a valve stock of forgeable mixed phase alpha/beta titanium based material; (b) hot working said first zone at a temperature below the beta transus temperature, (c) forging said second zone and, either simultaneously with said forging or subsequent thereto, heat treating said second zone at a temperature above (e.g., 25°–200° F. above) the beta transus temperature for a period of time to achieve beta processing followed by cooling to 1400° F. at a rate of 0.1–10.0° F./second; and (d) heat treating, immediately subsequent to either step (b) or step (c), at least the first zone at a temperature below the beta transus temperature (e.g., 25°–200° F. below) for a period of time to achieve alpha/beta processing.

18 Claims, No Drawings

TITANIUM ENGINE VALVE AND METHOD OF MAKING

BACKGROUND OF THE INVENTION

1. Field of the Invention

This invention relates to engines valves and, more particularly, the art of making titanium engine valves.

2. Description of the Prior Art

An automobile engine valve represents a challenging application for titanium based materials (the latter is used herein to mean titanium or titanium alloys in which titanium is present in an amount of at least 70% by weight). The operating temperature range of an automobile exhaust valve (head zone) exceeds that at which most titanium alloys are used in aerospace applications.

Optimally, the material properties for an automobile engine valve should vary depending upon the location within the valve. The head of the valve is subjected to a long-term, high temperature environment (up to 1400° F.) which, without adequate creep resistance of the material, leads to deformation of the head over a long period of time at such high temperatures. The stem and fillet zones of such valve are subjected to lower temperatures (up to 1200° F.), being more remote from the high temperature combustion chamber, but are subjected to high tensile shock and fatiguing forces from the camshaft and valve spring action, which function upon the stem and fillet of such valve. Accordingly, tensile, shock and fatigue strength are important physical characteristics in such location.

The prior art has attempted to recognize such different physical needs of an engine valve. To meet such needs, one approach has been to make the head and the stem separate items and lock them together by a variety of modes (see U.S. Pat. Nos. 2,002,641; 1,547,125; 1,230,140). Another approach has been to influence the initial casting of the valve material through local chilling or through controlled casting conditions and then to vary the microstructure by aging some localized portion of the valve after it has been forged to final shape (see U.S. Pat. Nos. 1,347,542 and 3,536,053). Unfortunately, these approaches work only with ferrous alloys. Casting of titanium leads to inferior physical properties and thus influencing the casting of titanium to achieve a dual microstructure would not be rewarding.

Because titanium offers such dramatic decrease in weight, engine valves, particularly for racing engines, have been developed from titanium alloys. Certain physical properties are potentially limiting with titanium alloys: creep strength (which is time dependent deformation at high temperatures) is limiting in the valve head area, while tensile, shock and fatigue strengths are limiting physical characteristics in the valve stem area. Although titanium alloys can be thermomechanically processed in a variety of ways to give different microstructures, dual microstructures have not been obtained nor attempted. Some alloys are processed to be very creep resistant but have only moderate strength, while other alloys have excellent strength and fatigue properties but only moderate creep resistance. All of such approaches with titanium alloy valves have produced a singular, continuous microstructure throughout the valve and have lacked the ability to obtain dual characteristics of high creep strength on the one hand and high fatigue, tensile and shock strengths on the other hand.

An object of this method invention is to provide a titanium based engine valve that has increased creep strength at high temperatures in one zone and increased tensile strength, and fatigue and shock resistance in another zone.

Another object of this invention is to fabricate a mixed alpha/beta phase titanium based engine valve and impart fine, equiaxed, microstructural grains to one zone of the valve and a colony type microstructure to another zone.

SUMMARY OF THE INVENTION

The invention is, firstly, a method of making a dual microstructure titanium based engine valve, wherein a first zone of such valve contains essentially a mixture of fine equiaxed alpha and transformed beta crystalline grains which exhibit high tensile strength and fatigue resistance, and a second zone of the valve which contains essentially a colony type microstructure exhibiting resistance to high temperature creep. The method comprises: (a) preparing a valve stock of forgeable, mixed phase alpha/beta titanium based material; (b) hot working the first zone at a temperature below the beta transus temperature; (c) forging said second zone and, either simultaneously with said forging or subsequent thereto, heat treating said second zone at a temperature above the beta transus temperature for a period of time sufficient to achieve beta processing followed by cooling to a temperature of 1400° F. at a rate of 0.1–10.0° F./second; and (d) heat treating, immediately subsequent to either step (b) or step (c), at least the first zone at a temperature below the beta transus temperature for a period of time to achieve alpha/beta processing.

In a first preferable mode, the first zone is formed as a valve stem and is hot worked (extruded) at a temperature in the alpha/beta region (25–200° F. below the beta transus temperature), and the second zone is forged while in the temperature range of 25–200° F. above the beta transus temperature and said cooling is carried out in air, inert gas or vacuum.

In a second preferred mode, the first zone may be hot worked (extruded) at a temperature in the alpha/beta region followed by hot working of the second zone (forging) in the alpha/beta temperature region; only the second zone (head) is then immediately heated to above but within 25–200° F. of the beta transus temperature and for a period of time to achieve beta processing followed by cooling to 1400° F. at a rate of 0.1–10.0° F./second.

Secondly, the invention is also a unitary engine valve construction consisting of a titanium alloy body having (a) a stem portion with a fine grained, equiaxed mixture of alpha regions and colony microstructure exhibiting, at a temperature of 1400° F., a tensile strength of at least 20 ksi and a fatigue strength of at least 10 ksi; and (b) a head portion with a substantially uniform colony microstructure exhibiting a creep resistance, at a temperature of 1400° F., of only 1.0% strain under 4 ksi for at least 100 hours and typically 350 hours.

DETAILED DESCRIPTION AND BEST MODE

The method of this invention essentially comprises four steps: (a) preparing a valve stock of forgeable mixed alpha/beta titanium based material, (b) hot working the stem or first zone of the stock at a temperature below the beta transus temperature, (c) forging the head or second zone of the stock while simultaneously or subsequently heat treating such zone or head by heating to above the beta transus temperature to achieve beta processing followed by cooling to 1400° F. at a rate of 0.1–10.0° F./second, and (d) heat treating at least the first zone or stem at a temperature below the beta transus temperature to achieve alpha/beta processing, the heat treatment being effected either immediately following the hot working of said first zone in step (b) or following the heat treatment of said second zone in step (c).

Preparing the Valve Stock

The valve stock is typically formed by either hot working a titanium based billet into rod stock or by casting titanium based material to the rough shape, such as taught for steels in the article by J. A. Newton, "Engineering of the Poppet Valve", *A Symposium On Internal Combustion Engine Valves*, published by Thompson Products, Inc., Cleveland, Ohio, 1956, pp. 65–78. Powder metallurgy, where the elemental titanium powder is blended with alloy powders, may also be used but results in poorer fatigue strength. The rod stock is typically ¾ to 1 inch in diameter and is severed into 1 inch slugs. The rod stock is mill annealed to contain a mixed alpha/beta microstructure.

Pure titanium exists in two allotropic crystal structures: alpha which has the hexagonal close packed structure and is stable at temperatures below 882° C., and beta which is body centered cubic and stable at higher temperatures. Alloying additions change the temperature (beta transus) at which the alpha/beta transition occurs and thus can be classified as alpha or beta stabilizer agents, depending on whether they raise or lower the transus temperature. Among the alpha stabilizer agents which raise the beta transus temperature are aluminum and the interstitials: carbon, oxygen and nitrogen, with the interstitials present as controlled impurities. There are a variety of beta stabilizing elements which lower the beta transus temperature such as vanadium, chromium and molybdenum, the addition of which result in alloys whose properties depend on the ratio of phases present (alpha, beta and others) and on their morphology. Alloy additions of tin and zirconium are neutral with respect to stabilizing either alpha or beta phase due to their solubility in both. However, they alter the kinetics of phase transformation and thus are used to produce favorable heat treatment characteristics.

Most titanium alloys are composed of a mixture of alpha and beta phases and are of interest to this invention. As might be expected, there are a range of compositions, some of which tend to embody the characteristics of alpha and others which are more similar to beta. The mechanical properties of these alloys depend strongly on the phases present and their morphology. In turn, the microstructure is strongly dependent on thermomechanical processing (metal working and heat treatment). It has been discovered herein that the alpha/beta alloys lend themselves to improvement for a given application through microstructural tailoring. The microstructure produced by heat treatment for about ½ to 8 hours at temperatures 25°–200° F. below the beta transus temperature (called alpha/beta processing) imparts the alpha/beta titanium alloy with high strength, ductility, and resistance to fatigue crack initiation at the expense of creep and fatigue crack growth resistance. Heat treatment for about ½ to 8 hours at temperatures 25°–200° F. above the beta transus (called beta processing) will give a microstructure that leads to high resistance to creep and fatigue crack growth and high toughness at the expense of tensile strength, ductility, and fatigue crack initiation resistance.

The alloying ingredients in the stock are present in an amount to achieve no less than 5% by volume beta microstructure and the remainder no greater than 95% alpha. This is usually obtained by use of both alpha and beta stabilizing agents. As a general guide, the alloying ingredients which function as alpha and beta stabilizing agents should be contained in the titanium based material so that the percentage amount (by weight) of the alpha stabilizing agents is equal to or greater than the percentage amount (by weight) of the beta stabilizing agents and also is not in excess by more than 4%.

The beta transus temperature is of significance because heat treatment or hot working above or below this temperature will permit differential microstructures to be created in a unitary body. When the alpha/beta titanium alloy stock is subjected to a temperature below the beta transus temperature for a sufficient period, a mixture of fine, equiaxed alpha regions and tranformed beta grains (colony type microstructure) will appear, such mixed phases exhibiting very high tensile strength and fatigue resistance. When subjected to temperatures above such transus temperature for a sufficient period, the pure beta phase will appear and, when cooled at an appropriate rate, will provide a colony type microstructure consisting of long platelets of alpha stacked and bonded together by a beta phase film. The cooling rate to at least the temperature of 1400° F. is important because it creates a desirable alignment of platelets which obtains good creep resistance.

The exact beta transus temperature will vary depending upon the type of alloy and the ingredients of such titanium type material. For example, a titanium alloy containing Ti-6Al-4V will have a beta transus temperature of 1815° F. For the titanium alloy of Ti-6Al-2Sn-4Zr-2Mo-0.1 Si, the beta transus temperature will be 1835° F. For the titanium alloy containing Ti-5Al-5Sn-2Zr-4Mo-0.3Si, the beta transus temperature will be 1760° F. For the titanium alloy of Ti-5Al-6Sn-2Zr-1Mo-0.3Si, the beta transus temperature will be 1860° F.

Hot Working the First Zone

The titanium based stock is designated to have generally two zones: a first zone which is to comprise essentially the stem and fillet at the juncture between the head and stem, and a second zone which is to comprise essentially the head of the valve (see U.S. Pat. No. 3,536,053).

The first zone, or stem, is hot worked at a temperature just below the beta transus temperature (that is, within 25°–200° F. of the transus temperature) for a period of time equivalent to the hot working period. Due to the short time period at this hot working temperature, alpha/beta processing is not achieved at this stage of this process mode. Alpha/beta processing is defined herein to mean heat treating at a temperature below and within 25°–200° F. of the beta transus temperature for the material and for a period of time (usually 0.5–8 hours) so that, upon cooling from this temperature, a microstructure will result consisting of fine, equiaxed regions of alpha grains and regions of small colony type microstructures. Colony type microstructure is stacked, long platelets of alpha interspersed and bonded with thin films of beta.

Hot working can be carried out by hot extrusion, using pressures and strain rates which are sufficient to achieve the shape desired, leaving an undeformed material at the end of the stock which looks like and is called an onion. When hot working just below the beta transus temperature, the material is sufficiently workable and a mixed microstructure in the titanium based material of both alpha and beta phases will be retained. The ratio between alpha and beta will be alloy dependent. The amount or ratio of alpha and beta stabilizing agents should be selected to provide a minimum of 5% (by volume) beta phase, and preferably no greater than 40% beta phase.

Forging and Heat Treating the Second Zone

Upon conclusion of the first zone hot working step above, the second zone of metal valve preform is forged, utilizing a pressure and strain rate sufficient to obtain the shape desired without cracking, and while simultaneously or subsequently heat treating the second zone (head), only, by heating to just above the beta transus temperature to achieve beta processing followed by cooling to 1400° F. at a rate of 0.1–10.0° F./second. Beta processing is defined herein to mean heating the titanium alloy at a temperature exceeding and up to 200° F. above the beta transus temperature (preferably 25–200° F. above the beta transus temperature) for a period of time (e.g., ½ to 8 hours) to obtain, upon cooling, a colony microstructure consisting exclusively of coarse, stacked, long platelets of alpha bonded with thin films of beta grains. For the titanium alloys indicated above, such beta transus temperature will be in the range of 1760–1860° F. Further disclosure as to how forging may be carried out for purposes of shaping titanium is disclosed in (a) J. V. Scanlon and G. J. G. Chambers, "Forgings in Titanium Alloys", *Science Technology and Application of Titanium*, Pergamon Press, 1970, pp. 79–95 and 97–110; (b) C. C. Chen and J. E. Coyne, "Recent Developments in Hot-Die Forging of Titanium Alloys", TI-80 *Science and Technology*, TMS-AIME, 1980, pp. 2513–2522.

The microstructure in the head, as a result of such forging and heat treatment, will exhibit very high creep resistance both at room temperature and at elevated temperatures.

Heat Treating the First Zone After Second Zone Forging and Heat Treatment

After the second zone forging and heat treatment step is completed, at least the first zone (stem) of the valve is heat treated at a temperature below the beta transus temperature for a period of time of ½ to 8 hours to obtain alpha/beta processing. It is alternatively acceptable to provide alpha/beta processing of the first zone immediately after extrusion and prior to second zone forging or heat treatment.

Alternatively, the method may be carried out by again forming the single titanium valve stock, and again using the initial step of extruding the stem at a temperature below the beta transus, in the alpha/beta region, but forging the head at a temperature below the beta transus rather than above that temperature. After such forging has been completed, the head is subjected to beta processing for a period of time of about ½ to 8 hours. The final step again comprises heat treating the entire valve with alpha/beta processing to produce the desired microstructure in the first zone (stem and fillet). The microstructure of the second zone (head) is not affected by the subsequent alpha/beta processing because it is stable at these temperatures with only a slight thickening of the alpha plates occurring. The colony structure is an equilibrium structure that does not easily change except over an exceptionally long period of heat treatment which will not occur with alpha/beta processing.

It is preferable, at times, to fabricate the head and stem separately as distinct preforms and to inertially weld such members together. Following this invention and such sequence, the second zone (head) would be forged to the desired shape as a separate piece, with the forging being conducted above the beta transus temperature or, similarly, by forging in the alpha/beta region followed by heat treatment above the beta transus temperature for beta processing. The first zone (stem), of course, as a separate preform, is extruded or hot rolled at temperatures in the alpha/beta region and then heat treated for alpha/beta processing as before. The two separate pieces are then inertia welded together to form a single valve. It is possible to use different titanium alloys for the individual pieces, such as the creep resistant alloy Ti-5Al-6Sn-2Zr-1Mo in a beta processed condition for the head and the high strength alloy Ti-5Al-5Sn-2Zr-4Mo-.3Si in the alpha/beta processed condition for the stem.

Valve Structure

Practice of the above process modes will result in an engine valve consisting of a titanium based material (a) a stem and fillet portion with fine, equiaxed regions of alpha and regions of colony microstructure, a grain size of 5–50 microns, and characterized by: a high tensile strength of at least 140–180 ksi at room temperature, at least 90–105 ksi at 950° F., and at least 20 ksi at 1400° F., a fatigue strength of at least 60–90 ksi at room temperature, 45–55 ksi at 950° F., and at least 10 ksi at 1400° F.; and (b) a head portion with a colony type microstructure, a colony size of 50–300 microns, and having a creep strength which permits no greater than 1.0% strain under 4 psi stress after 100 hours at 1400° F.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

I claim:

1. A method of making a dual microstructure titanium based engine valve, wherein a first zone of said valve contains essentially a mixture of fine, equiaxed alpha and transformed beta crystalline grains which exhibit high tensile strength and high fatigue resistance, and a second zone of said valve which contains essentially colony type alpha/beta crystalline grains exhibiting resistance to high temperature creep, the method comprising:
  (a) preparing valve stock for each of said zones of forgeable mixed phase alpha/beta titanium based material;
  (b) hot working said first zone at a temperature below the beta transus temperature;
  (c) forging said second zone and, either simultaneously with or subsequent thereto, heat treating said second zone at a temperature above the beta transus temperature for a period of time to achieve beta processing followed by cooling of said second zone to a temperature of 1400° F. at a rate of 0.1–10.0° F./second; and (d) heat treating, immediately subsequent to step (b) or step (c) at least said first zone at a temperature below the beta transus temperature for a period of time to achieve alpha/beta processing.

2. The method as in claim 1, in which heat treating in step (d) is in the temperature range of 25°–200° F. below said beta transus temperature.

3. The method as in claim 1, in which said hot working of step (b) is carried out by extrusion of said first zone of the valve, and said forging of step (c) is carried out simultaneously with heating of said second zone to a temperature in the range 25°–200° F. above said beta transus temperature.

4. The method as in claim 1, in which said hot working of step (b) is carried out by extruding said first zone, and in step (c), forging of step (c) is carried out at a temperature above or below the beta transus temperature, followed by heating only said second zone to a temperature above the beta transus temperature for a period of time to achieve beta processing.

5. The method as in claim 1, in which in step (c) said second zone is forged.

6. The method as in claim 1, in which said first zone is extruded to form a stem and fillet, said second zone being forged to form a valve.

7. The method as in claim 6, in which beta processing is that which obtains a colony structure having a substantially uniform existence of long alpha platelets interspersed with films of beta grains.

8. The method as in claim 7, in which said colony structure has a colony size of 50–300 microns.

9. The method as in claim 1, in which alpha/beta processing is that which obtains a microstructure having a substantially uniform existence of mixed regions of alpha microstructure and regions of colony microstructure.

10. The method as in claim 9, in which said microstructure has a grain size of 5–50 microns.

11. The method as in claim 1, in which said zones are independent preforms during processing and are welded together following the process to form the completed engine valve.

12. The method as in claim 1, in which beta processing is carried out for at least ½ hour.

13. The method as in claim 1, in which said alpha/beta processing is carried out for at least ½ hour.

14. The method as in claim 1, in which said stock is comprised of Ti-6Al-4V alloy and has a beta transus temperature of 1850° F.

15. The method as in claim 1, in which said stock is comprised of Ti-6Al-2Sn-4Zr-2Mo-0.1Si alloy and has a beta transus temperature of 1835° F.

16. The method as in claim 1, in which said stock is comprised of Ti-5Al-5Sn-2Zr-4Mo-0.3Si alloy and has a beta transus temperature of 1760° F.

17. The method as in claim 1, in which said stock is comprised of Ti-5Al-6Sn-2Zr-1Mo-0.3Si alloy and has a beta transus temperature of 1860° F.

18. The method as in claim 1, in which said titanium based material contains alloying ingredients which function as alpha and beta stabilizing agents to provide a volume of beta phase which is not less than 5% and not greater than 40%.

* * * * *